United States Patent [19]

Roberts

[11] Patent Number: 5,022,805
[45] Date of Patent: Jun. 11, 1991

[54] CANTILEVER MOUNTING SYSTEM FOR STRUCTURAL MEMBERS HAVING DISSIMILAR COEFFICIENTS OF THERMAL EXPANSION

[75] Inventor: Martyn G. Roberts, Roswell, Ga.

[73] Assignee: Rolls-Royce Incorporated, Greenwich, Conn.

[21] Appl. No.: 310,968

[22] Filed: Feb. 16, 1989

[51] Int. Cl.[5] .................. F16B 43/02; F02K 3/10
[52] U.S. Cl. ........................... 411/468; 411/544; 411/916; 60/261; 60/39.32
[58] Field of Search .................. 60/39.32, 261, 753; 403/28, 29, 30, 179, 334; 411/368, 369, 544, 535, 536, 916

[56] References Cited

U.S. PATENT DOCUMENTS

| | | | |
|---|---|---|---|
| 3,056,261 | 10/1962 | Krabacher et al. | 60/261 |
| 3,670,501 | 6/1972 | Arand | 60/261 |
| 4,299,018 | 11/1981 | Bickerstaff et al. | 403/179 |
| 4,512,699 | 4/1985 | Jackson et al. | 411/368 |
| 4,650,385 | 3/1987 | Jackson et al. | 411/368 |
| 4,850,732 | 7/1989 | Swanson | 403/29 |

Primary Examiner—Louis J. Casaregola
Assistant Examiner—John A. Savio, III
Attorney, Agent, or Firm—Oliff & Berridge

[57] ABSTRACT

In a reheat system of an aircraft gas turbine engine there is provided a cantilever mounting for a ceramic tubular flameholder 10 on a metal bracket 11, the bracket being provided with a face having an upstanding annular flange 16 adapted to mate with the outer surface 19 of an end portion of the flameholder, there being further provided fastener means 12 adapted to retain the end face of said end portion of the flame holder adjacent and facing said face of the bracket, characterized in that said end portion of the flameholder is provided by a frusto-conical section 27 having first and second surfaces 18, 19 of different angles such that line extensions of each surface coincide at respective imaginary vertices on the axis of the flame holder.

5 Claims, 3 Drawing Sheets

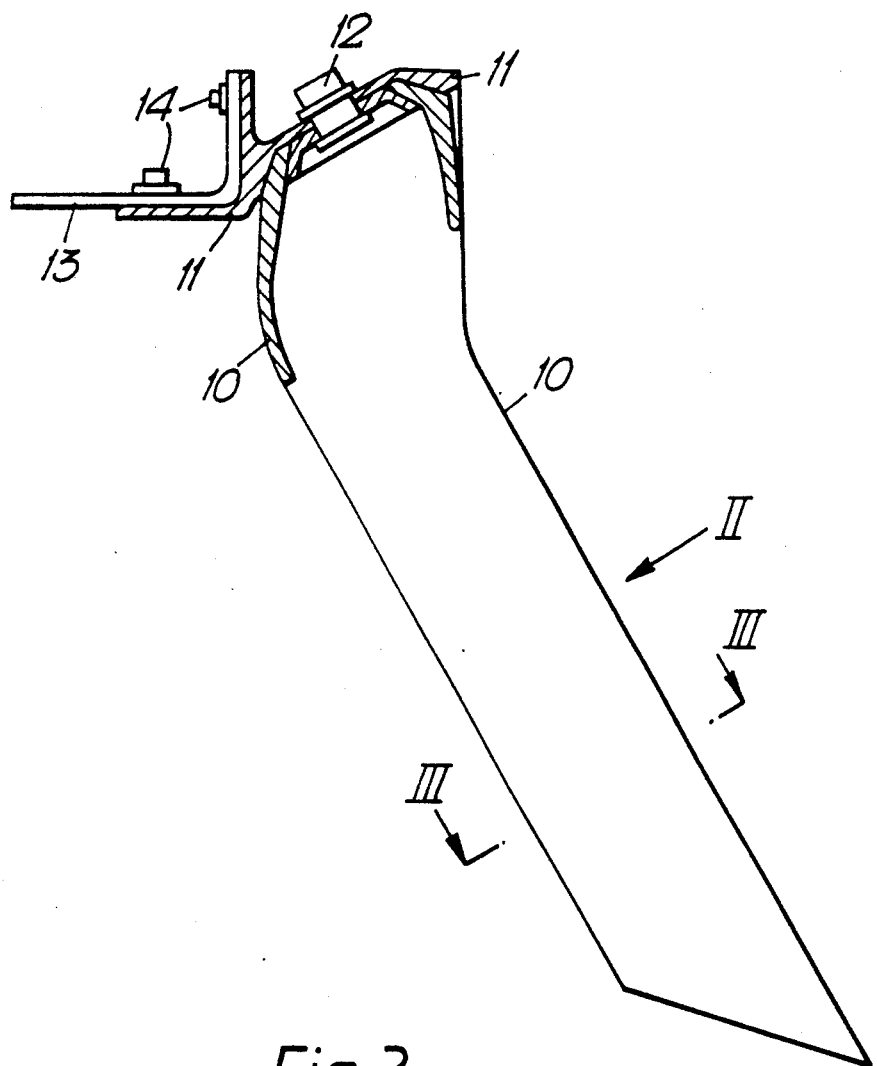
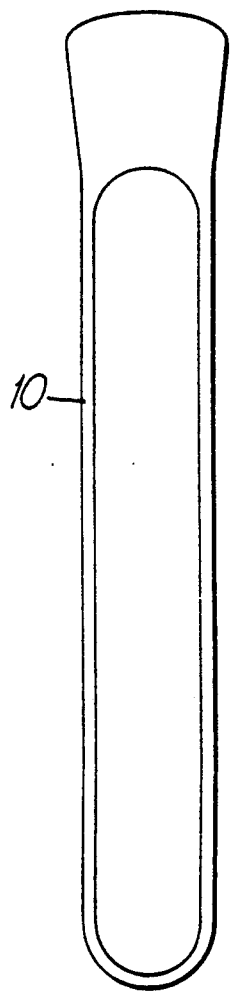
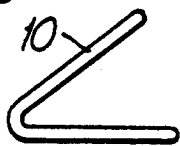

CANTILEVER MOUNTING SYSTEM FOR STRUCTURAL MEMBERS HAVING DISSIMILAR COEFFICIENTS OF THERMAL EXPANSION

This invention concerns improvements in the cantilever mounting of structural members which have dissimilar coefficients of thermal expansion, and in particular relates to improvements in structural members in a reheat system of an aircraft gas turbine engine.

Reheat (also known as afterburning) is a method of augmenting the basic thrust of an aircraft gas turbine engine to improve the aircraft take-off, climb and, where necessary, the performance. The increased power could be obtained by the use of a larger engine, but as this would increase the weight, frontal area and overall fuel consumption, reheat provides the best method of thrust augmentation for short periods.

Reheat consists of the introduction and burning of fuel between the engine turbine and the jet pipe propelling nozzle, utilising unburned oxygen in the exhaust gas to support combustion. In one system this is achieved by means of tubular flameholders (or afterburners) arranged so that the flame is concentrated around the axis of the jet pipe. The resultant increase in the temperature of the exhaust gas gives an increased velocity of jet leaving the propelling nozzle and therefore increases the engine thrust.

In the reheat system as known, a tubular flameholder is mounted in a cantilevered fashion on a support ring. It is also known to manufacture the flameholder of metal and to cool the metal subassembly when the engine is operating so as to minimise adverse thermal effects.

However, if the flameholder is a reinforced or toughened ceramic, carbon-carbon or other composite material that has a different coefficient of thermal expansion to that of the support ring then undesirable thermal stresses will be set up in the assembly when the engine is operating. Such undesirable thermal stresses cannot adequately be contained by cooling.

It is an object of the present invention to provide, in the reheat system of an aircraft gas turbine engine, a flameholder and bracket subassembly which is designed to minimise thermal stresses in the assembly when the flameholder and the support ring are made of materials having different coefficients of thermal expansion.

According to the present invention there is provided a cantilever mounting for a tubular member on a support member having a coefficient of thermal expansion different to that of the tubular member, the support member being provided with a face having an upstanding annular flange adapted to mate with the outer surface of an end portion of the tubular member, there being further provided fastener means adapted to retain the end face of said end portion of the tubular member adjacent and facing said face of the support member, characterised in that said end portion of the tubular member is provided by a frusto-conical section having first and second surfaces of different angles such that line extensions of each surface coincide at respective imaginary vertices on the axis of the tubular member.

An embodiment of the present invention will now be described by way of example with reference to the accompanying drawings in which, FIG. 1 is an axial section through part of a reheat system of a gas turbine engine, including a flameholder;

FIG. 2 is a view of said part of the reheat system of FIG. 1 taken in the direction of arrow II of FIG. 1;

FIG. 3 is a section through the flameholder of FIG. 1, taken at III—III;

Figure 4:
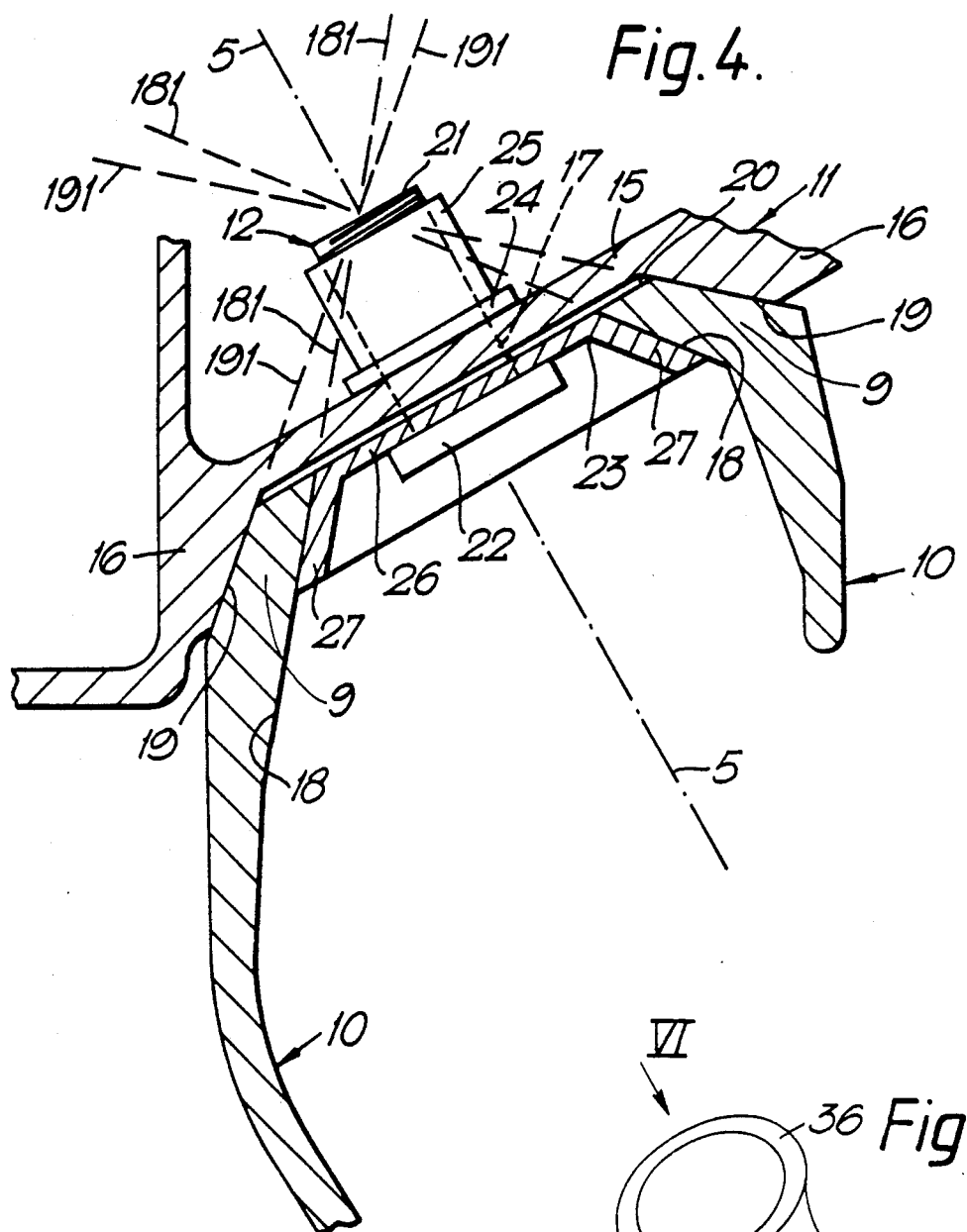
FIG. 4 is a detail cross-section view of a portion of FIG. 1, the portion being a bracket for the flameholder.
Figure 5:
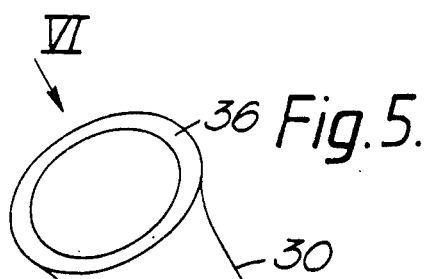
FIG. 5 is a perspective view of an alternative form of flameholder.
Figure 6:
FIG. 6 is an end-on view of the flameholder of FIG. 5, taken in the direction of arrow VI.

Referring to FIG. 1 there is shown generally in the reheat system of an aero gas turbine engine a ceramic radial flameholder 10 fastened to a metal bracket 11 by means of a first fastener assembly 12. The bracket 11 is in turn mounted on a supporting ring member 13 by means of a second fastener assembly 14.

FIGS. 2 to 4 show further views of the construction of the flameholder 10, from which it will be seen that the flameholder is of a generally rectilinear v-section shape. The end of the flameholder 10, where it is fastened to the bracket 11, tapers and is of circular cross-section, as shown in FIGS. 1 and 4. The rest of the flameholder 10 changes from circular cross-section to the open v-section, as shown in FIG. 3.

With reference to FIG. 4 the bracket 11 comprises a plate member 15 provided with an integral upstanding flange 16 defining a frusto-conical cavity. An aperture 17 is provided through the plate member 15 into the frusto-conical cavity from the opposed side of the plate member, and is dimensioned to take the shank portion of a bolt 21 that is part of the first fastener assembly 12.

That end of the flameholder 10 which is adapted to be fastened to the bracket 11 is formed into a radially inwardly directed lip 9 having internal and external conical surfaces 18, 19 respectively. The external conical surface 19 of the lip 9 mates with the frusto-conical surface defined by the flange 16 and is dimensioned so that there is a gap 20 between the plate member 15 and the facing parallel end face of the flameholder 10. The gap 20 is shown exaggerated in the drawing in the interests of clarity.

The flameholder 10 is held fast in the frusto-conical cavity defined by the flange 16 of the bracket 11 by means of the first fastener assembly 12. The first fastener assembly 12 comprises the bolt 21, which has a head end 22, a shank, and a threaded end opposed to the head end, a frusto-conical washer 23, a flat washer 24, and a nut 25 adapted to screw onto the threaded end of the bolt.

The frusto-conical washer 23 comprises a planar annular portion 26 provided with a circumferential upstanding frusto-conical section 27. The washer 23 is adapted to be located on the shank of the bolt 21 so that the planar portion 26 of the washer separates the head 22 of the bolt from the plate member 15, the bolt being inserted in the plate member so that the head of the bolt lies on the flameholder side of the plate member. The frusto-conical section 27 of the washer 23 is shaped to mate with the internal conical surface 18 of the flameholder 10, the bolt 21 is retained in position on the plate member 15 by means of the flat washer 24 and nut 25 on the threaded end of the bolt.

The angles of the conical surfaces 18, 19 of the lip 9 of the flameholder 10 are different (i.e. the surfaces are non-parallel), and are chosen to give a thermally stress-free interface between the ceramic flameholder 10 and the metal bracket 11. If the flameholder 10 is made of a thermally isotropic material (i.e. a material that has a coefficient of thermal expansion that is substantially independant of the direction in which it is measured) then the angles of the conical surfaces 18, 19 will be such that line extensions of each cone surface (indicated in FIG. 4 by dashed lines 181, 191 respectively) will converge to coincide at a single point on the axis 5 of the bolt 21. If, however, the flameholder 10 is made of a thermally anisotropic material then it will be necessary to arrange for the angles of the conical surfaces 18, 19 of the lip 9 to be such that the line extensions 181, 191 of the cone surfaces 18, 19 converge to meet respectively at two distinct points offset along the axis 5 of the bolt 21. The cone angles and amount of offset, if any, may be calculated in accordance with theory set out, for example, in "Theoretical Basis for Design of Thermal-Stress-Free Fasteners" by Max L. Blosser and Robert R. McWithey, NASA Technical Paper 2226 (1983).

An alternative embodiment of the invention is now described with reference to FIGS. 5-8 of the accompanying drawings.

Figure 7:
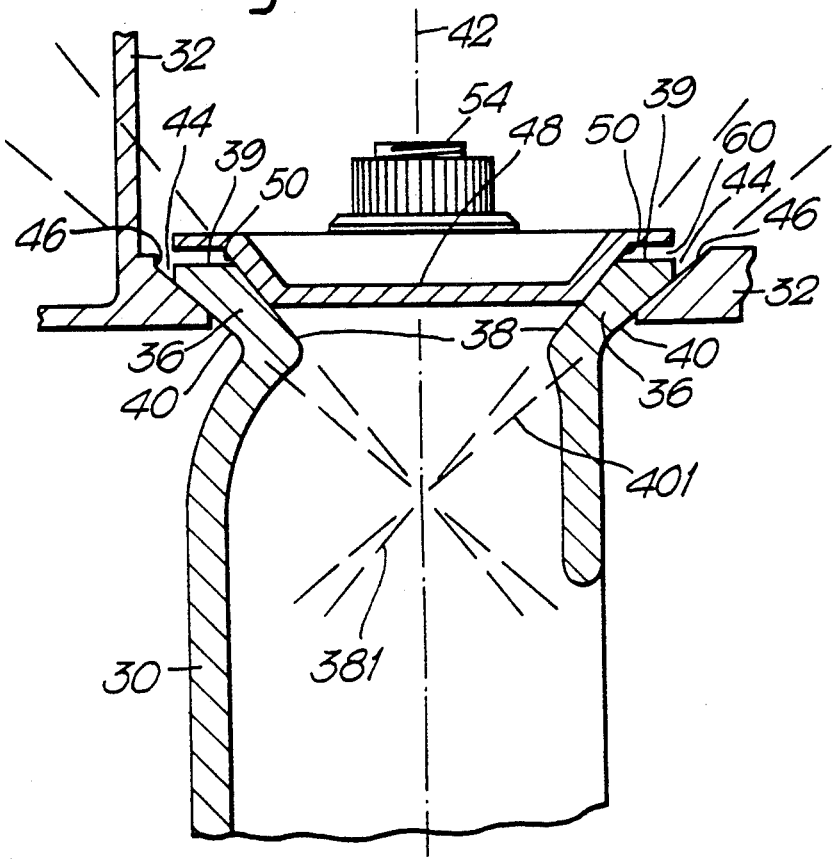
FIG. 7 is an axial section through a further embodiment of a bracket for the flameholder of FIG. 5, taken in the direction of arrow VII of FIG. 8.
Figure 8:
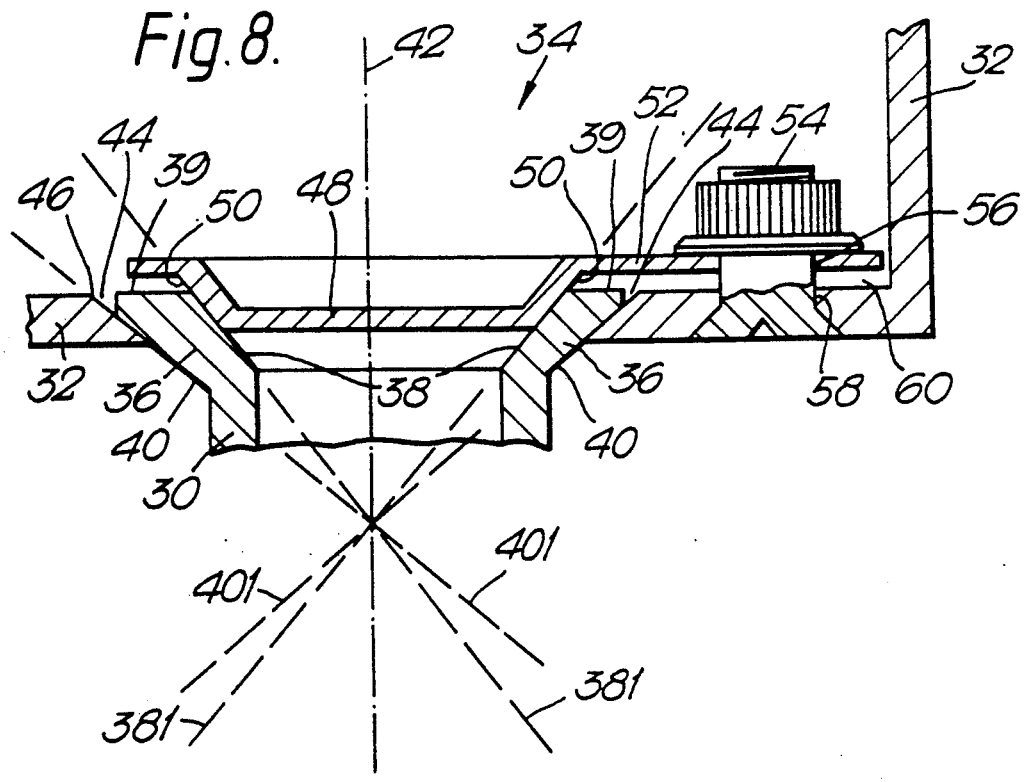
FIG. 8 is an axial section through the embodiment of FIG. 7, taken in the direction of arrow VIII of FIG. 7.

Referring to FIGS. 5-8 there is shown a ceramic flameholder 30 fastened, as shown in FIGS. 7 and 8, to a metal bracket 32 by means of a retaining or third fastener assembly 34.

That end of the flameholder 30 which is fastened to the metal bracket 32 is in the form of a radially outwardly directed lip 36. The internal and external surfaces 38, 40 respectively of the lip 36 are frusto-conical and of different angles such that respective line extensions 381 and 401 of surfaces 38, 40 meet on the longitudinal axis 42 of the lip 36 within the flameholder 30, as shown in FIGS. 7 and 8. An annular end face 39 of the lip 36 joins the surfaces 38, 40.

The bracket 32 is provided with a frusto-conical aperture 44. The diameter of the aperture 44 matches the external diameter of the lip 36, and the angle of the frusto-conical face 46 of the aperture is equal to the angle of the external frusto-conical surface 40 of the lip, so that the flameholder 30 is supported in the aperture by means of the lip.

The retaining assembly 34 comprises a circular frusto-conical plate 48 in which the external diameter matches the internal diameter of the lip 36 and the angle of the external frusto-conical surface 50 of the plate is equal to the angle of the internal frusto-conical surface 38 of the lip, so that the plate 48 seals the aperture of the lip.

The plate 48 is provided with a radially extending flange 52. The plate 48 is held in position within the lip 36 by means of a nut and bolt assembly 54 extending through axially aligned apertures 56, 58 in the flange 52 and bracket 32 respectively, thus fastening the flameholder 30 to the bracket 32. The dimensions of the plate 48 and the lip 36, and their respective frusto-conical angles, are chosen so that a gap 60 is defined between the end face 39 of the lip 36 and the flange 52. The gap 60 is shown exaggerated in the interests of clarity.

As in the first embodiment of the invention the angles of the conical surfaces 38, 40 are chosen to give a thermally stress-free interface between the ceramic flameholder 30 and the metal bracket 32, such that line extensions 381, 401 converge on the axis 42 of the lip 36, either at one point if the flameholder is thermally isotropic, or at two points if the flameholder is thermally anisotropic. Necessary calculations may be made as indicated in the first embodiment.

In operation of the invention the angles of the cones are chosen to give a thermally stress free interface such that clamping of the flameholder 10 or 30 against the bracket 11 or 32 is maintained with temperature changes despite the bracket and flameholder having different expansion coefficients. This is achieved by allowing the cones to slide as the temperature increases and close up the controlled gap 20 or 60. Restricting the gap 20 or 60 also reduces the amount of spherical movement possible with the double cone arrangement.

Thus, the use of dual cones produces an apparent interface which is not constrained to lie within the parts. The configuration of the annular interface is also suitable for use with brittle materials in reducing bending stresses and stress concentrations.

The invention may be used as a generic cantilever mounting for materials of dissimilar coefficients of expansion, such as the mounting of ceramic or non-metal composite materials to metal.

I claim:

1. A cantilever mounting for a tubular member having an isotropic coefficient of thermal expansion different from that of the tubular member, (a) the tubular member comprising a conical end with a frusto-conical inner and outer faces having a common axis of symmetry and different cone angles relative to said axis of symmetry such that line extensions of said frusto-conical faces meet at a common point on said axis of symmetry, (b) the support member comprising an annular flange member having a female frusto-conical surface adapted to cooperate with the outer frusto-conical face of said end of the tubular member, (c) a fastener assembly comprising a male frusto-conical surface adapted to cooperate with the inner frusto-conical surface of said end of the tubular member and including means to urge the outer frusto-conical surface of said end of the tubular member into mating engagement with the female frusto-conical surface of the flange member, and (d) said cone angles providing a thermally stress-free interface between the support member and the tubular member when the members are in mating engagement.

2. The cantilever mounting as claimed in claim 1, wherein the means to urge the outer frusto-conical surface of said end of the tubular member into mating engagement with the female frusto-conical surface of the flange member is provided by a nut-and-bolt assembly the bolt of which extends through the support member and the fastener assembly.

3. The cantilever mounting as claimed in claim 1, wherein the common point of the axis of symmetry lies without the tubular member and the axis of symmetry extends through the bolt.

4. The cantilever mounting as claimed in claim 1 characterised in that the support member is made of metal and the tubular member is made of a non-metallic heat resistant material.

5. A cantilever mounting as claimed in claim 4 characterised in that the tubular member is provided by a flameholder and together with the support member provides an assembly in a reheat system of a gas turbine engine.

* * * * *